June 15, 1965     M. L. ANTHONY     3,189,752
EXCLUSIVE OR LOGICAL ELEMENT
Filed April 18, 1960                          2 Sheets-Sheet 1
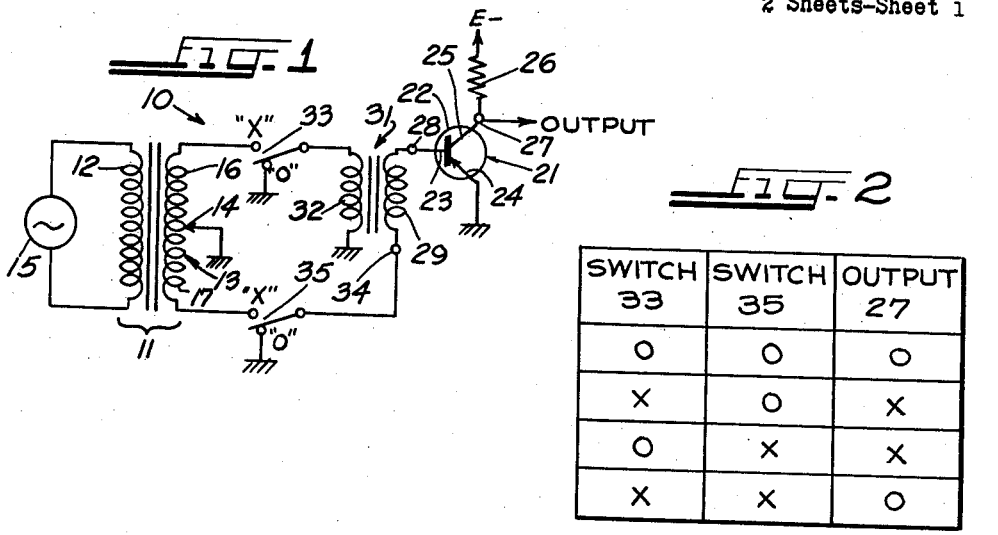
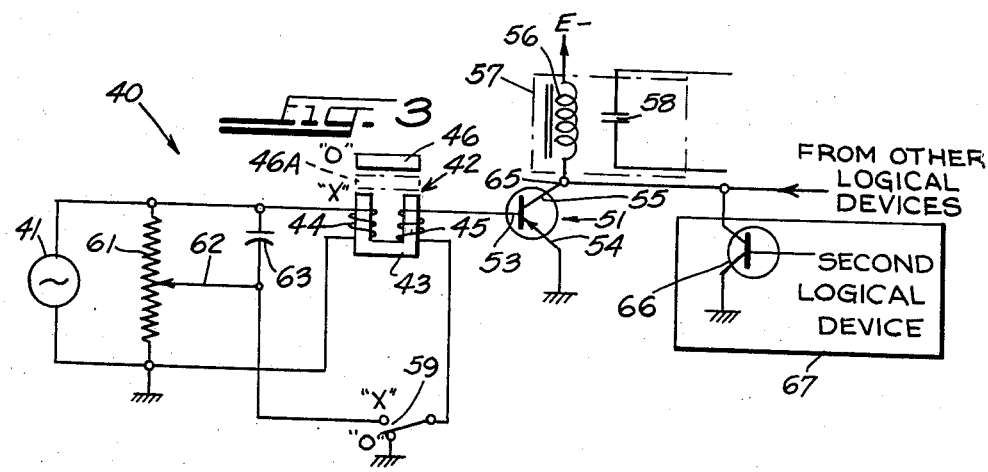
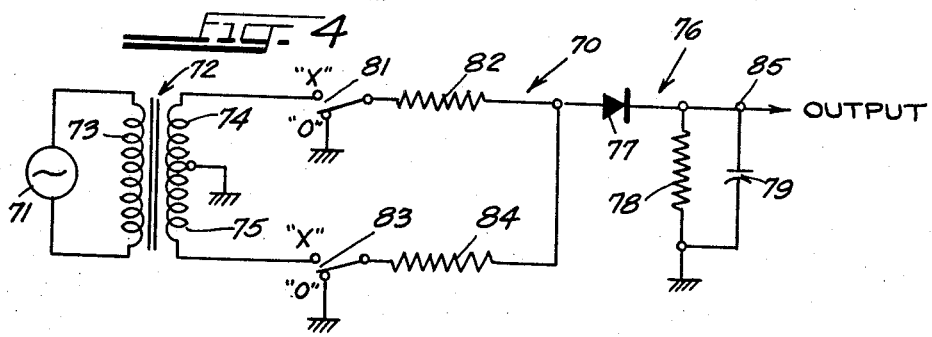
INVENTOR.
MYRON L. ANTHONY
BY

June 15, 1965  M. L. ANTHONY  3,189,752
EXCLUSIVE OR LOGICAL ELEMENT
Filed April 18, 1960  2 Sheets-Sheet 2
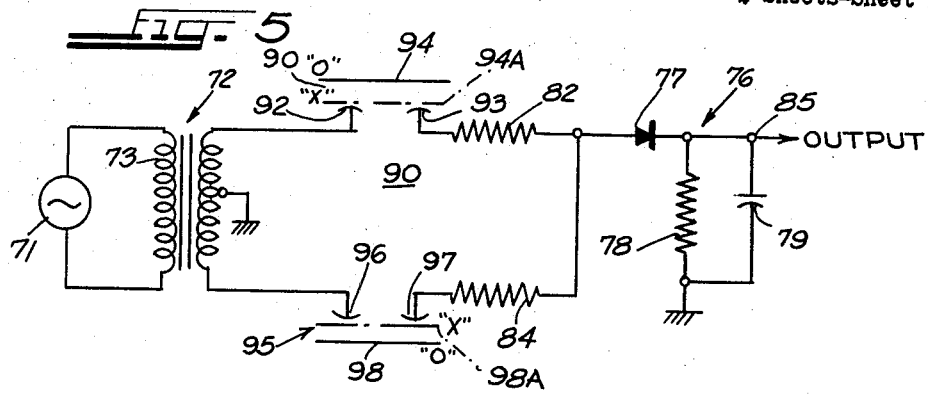
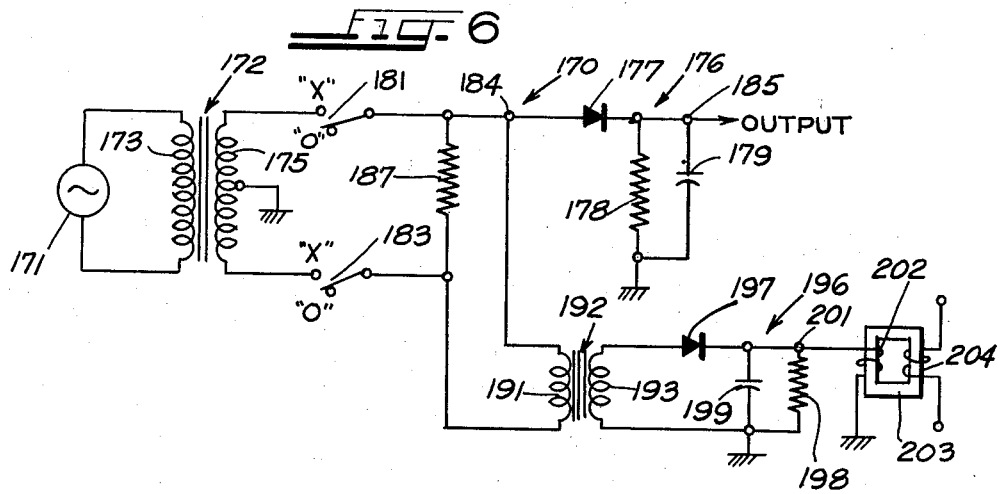
FIG. 7
| SWITCH 181 | SWITCH 183 | OUTPUT 185 | CARRY 201 |
|---|---|---|---|
| O | O | O | O |
| X | O | X | O |
| O | X | X | O |
| X | X | O | X |
INVENTOR.
MYRON L. ANTHONY
BY Thomas E. Dorn
ATTY.

United States Patent Office 3,189,752
Patented June 15, 1965

---

3,189,752
EXCLUSIVE OR LOGICAL ELEMENT
Myron L. Anthony, La Grange, Ill., assignor to Scully-Anthony Corporation, La Grange, Ill., a corporation of Illinois
Filed Apr. 18, 1960, Ser. No. 23,071
1 Claim. (Cl. 307—88.5)

This invention relates to logical devices, and more particularly to A.C.-actuated logical circuits of the kind usually referred to as coincidence or anti-coincidence circuits.

Logical circuits of various kinds are coming into increasing use in many types of control apparatus, as well as in computers and other calculating systems. In most instances, the logical circuits of the prior art have been D.C.-actuated devices, being controlled either by pulse signals of given polarity or by steady-state unidirectional potentials. For many logical functions, relatively simple and inexpensive circuits have been devised, but coincidence devices of the "Exclusive-Or" type, and other coincidence devices, have tended to be relatively complex and expensive in construction. Furthermore, even where relatively simple constructions have been available, it has frequently been necessary to provide special D.C. supplies for operation of the logical circuits. Moreover, in some instances it may be difficult to maintain prior art logical circuits in continuous operation, and without frequent maintenance, as is highly desirable or even necessary in many applications such as in machine tool control systems, other industrial control arrangements, and other applications where the control circuitry is subject to difficult environmental conditions.

A principal object of the invention, therefore, is to provide an improved coincidence device, suitable for use in computers, industrial control systems, or other applications, which is completely A.C.-actuated. A related object of the invention is to eliminate any need for a D.C. supply or for a pulse signal supply in a coincidence logical device which may be utilized in industrial and machine tool control systems as well as in computers and other applications.

Another object of the invention is to provide a new and improved A.C.-actuated coincidence device which is extremely simple and inexpensive in construction, yet highly reliable in operation.

An important object of the invention is to provide a new and improved logical device which may be effectively controlled by virtually any kind of variable impedance, including a variable capacitance, variable resistance, variable inductance, or a conventional switch, or combinations thereof. Thus, it is an object of the invention to increase the scope of available control devices, in a logical circuit of the coincidence type, without engendering a corresponding increase in the complexity or cost of the logical circuit.

Another object of the invention is to provide a new and improved A.C.-actuated coincidence device which is extremely rugged, being suitable for machine tool control systems or other heavy-duty applications, and which is essentially independent of fluctuations in power supply which may be occasioned by changing power demands of the controlled equipment. That is, it is an object of the invention to afford a new and improved A.C.-actuated logical device which may be operated directly from a conventional power supply that may also be used to actuate other equipment controlled by the logical device.

An A.C.-actuated logical device constructed in accordance with the invention comprises control signal means for developing first and second A.C. control signals having the same frequency. In its simplest form, this control signal means may comprise a conventional transformer or simple coupling circuit connected to a suitable A.C. power supply. The logical device further includes a detector having an input circuit and an output circuit. This detector may also be quite simple in construction and may comprise a conventional amplitude-detector including a single diode or a single transistor.

The logical device of the invention further includes first and second coupling circuits which couple the control signal generator means to the input circuit of the detector. These coupling circuits are utilized to apply the first and second control signals, individually, to the detector. Each include an independent variable impedance, which may be a switch, for varying the effective impedance of the coupling circuit between a high-impedance condition and a low-impedance condition. A variable capacitor, variable inductance, or variable resistance may also be employed. The two coupling circuits are intercoupled with each other to combine the first and the second control signals in substantially different phase, relative to each other, in the input circuit to the detector. Consequently, the detector affords an output signal of given amplitude level whenever either of the first and second control signals is applied to the detector individually, but produces a substantially different and much smaller output signal, or no output signal, whenever both control signals are applied to the input circuit and whenever netither control signal is applied to the input circuit.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a schematic diagram of an A.C.-actuated logical device, specifically an "Exclusive-Or" or quarter-adder circuit, constructed in accordance with one embodiment of the invention;

FIG. 2 is a truth table applicable to the logical circuit of FIG. 1;

FIG. 3 is a schematic diagram of a substantially different embodiment of the invention, and also illustrates the combination of several logical devices in the control of a single control element;

FIG. 4 is a schematic diagram of a further embodiment of the invention, similar to FIG. 1 but utilizing a different detector circuit;

FIG. 5 is a schematic diagram of a further embodiment of the invention, similar to FIG. 4, but utilizing a different kind of variable impedance as a control element;

FIG. 6 illustrates a different embodiment of the invention, constructed to operate as a half-adder; and FIG. 7 is a truth table illustrative of the operation of the circuit of FIG. 6.

The logical device 10 illustrated in FIG. 1 comprises an A.C.-actuated logical circuit which may be characterized as an "Exclusive-Or" circuit, sometimes known as a quarter-adder. The logical device 10 comprises an input transformer 11 having a primary winding 12 and a secondary winding 13, the secondary winding 13 being provided with a center tap 14 which is connected to a plane of reference potential here indicated as ground. The primary winding 12 of the input transformer 11 is connected to a suitable source of A.C. signals, here indicated as a generator 15. The logical device 10, like all of the other embodiments of the invention described hereinafter, may be operated directly from a conventional sixty-cycle power supply, and it should be understood that the generator 15 is representative of any conventional power supply including any suitable means for connection to a conventional sixty-cycle source. On the other hand, it is frequently preferable to use an operating signal of higher frequency, in which case the generator 15 may comprise a conventional oscillator circuit.

The input transformer 11, in the logical device 10, comprises a control signal generating means for developing first and second A.C. control signals having the same frequency. That is, the signals appearing across the two sections 16 and 17 of the secondary winding 13 are at the same frequency; however, these two A.C. signals are approximately 180° displaced in phase relative to each other, and this phase difference is utilized in operation of the logical device 10 as explained in detail hereinafter. The logical device 10 further includes a simple detector circuit 21 comprising a transistor 22 having a base electrode 23, an emitter electrode 24, and a collector electrode 25. The collector electrode 25 is connected in an output circuit for the detector 21, being connected through a resistor 26 to a suitable source of bias potential here designated as E—. The output terminal of the detector is designated by the reference numeral 27. The emitter electrode 24 of the transistor 22 is returned to ground. The base electrode 23 comprises the input electrode of the detector and is connected to one terminal 28 of the secondary winding 29 of a coupling transformer 31.

In the logical device 10, two individual coupling circuits are provided for coupling the input transformer 11 to the input circuits 28, 29 of the detector 21. The first of these two coupling circuits comprises the primary winding 32 of the coupling transformer 31. One terminal of the transformer primary 32 is connected through a switch 33 to the section 16 of the secondary winding 13 on the input transformer 11. The other terminal of the primary winding 32 of the coupling transformer 31 is returned to ground. The switch 33 is a single-pole double-throw device, the "X" terminal of the switch being connected to the input transformer 11 and the "O" terminal of the switch being grounded.

The second coupling circuit in the logical device 10 connects the terminal 34 on the secondary winding 29 of the coupling transformer 31 back to the second section 17 of the secondary winding 13 on the input transformer 11, a switch 35 being interposed in series in this second coupling circuit. The switch 35, like the switch 33, is a single-pole double-throw device, having an "X" terminal connected to the input transformer 11 and an "O" terminal which is grounded.

In considering the operation of the logical device 10 of FIG. 1, it may first be assumed that the two control switches 33 and 35 are in the positions shown therein, each of the two switches being connected to its "O" terminal. Under these conditions, the first coupling circuit comprising the switch 33 is effectively open-circuited, and no input signal is applied to the detector 21 through this circuit. Similarly, the second control circuit comprising the switch 35 is also open-circuited, so that no control signal is applied to the detector 21, from the input transformer 11, through this circuit. Since the detector 21, comprising the transistor 22, is effectively reverse-biased, the transistor does not conduct and no appreciable output signal is developed at the output terminal 27. It is thus seen that the operating conditions indicated by the first line of the truth table of FIG. 2, with both switches 33 and 35 in their "O" position, result in a negligible output signal at the output terminal 27, and this is defined as the "O" operating condition for the output of the detector 21.

A second operating condition is attained whenever either of the two control switches 33 and 35 is actuated to its closed or "X" condition. Thus, if the switch 33 is actuated to its "X" condition, a control signal is applied to the detector 21 through the coupling circuit comprising the section 16 of the secondary winding of the transformer 11, the switch 33, and the coupling transformer 31. As long as the switch 35 remains in its initial or "O" position, the actuation of the switch 33 to its "X" position causes the transistor 22 to conduct on alternate half cycles of the applied signal, developing an output signal of substantial amplitude at the output terminal 27 of the detector. This may be defined as the "X" operating condition of the detector, and is represented by the second line of the truth table of FIG. 2.

The closing of the control switch 35, while the switch 33 remains open, has essentially the same effect upon operation of the circuit as the closing of the switch 33 with the switch 35 open. Thus, when the switch 35 is closed to its "X" operating position, the switch 33 being in its "O" position, a control signal is applied to the input electrode 23 of the detector circuit 21 through the second coupling circuit comprising the winding section 17 in the secondary of the input transformer 11, the switch 35, and the secondary winding 29 of the coupling transformer 31. Once again, therefore, the detector transistor 22 conducts on alternate half cycles of the applied signal, with the result that an output signal of substantial amplitude appears at the output terminal 27 of the detector. Thus, the operating conditions are those illustrated by the third line of data in the truth table of FIG. 2.

A fourth operating condition can be achieved in the logical device 10 of FIG. 1 by actuating both of the two switches 33 and 35 to their closed or "X" positions. When this is done, a control signal is applied to the input electrode 23 of the detector circuit 21 through the first coupling circuit comprising the input transformer winding section 16, the switch 33, and the coupling transformer 31. At the same time, a second control signal is applied to the input of the detector circuit through the second coupling circuit comprising the input transformer winding section 17, the switch 35, and the secondary winding 29 of the coupling transformer 31. The secondary winding 29 of the coupling transformer 31 is common to the two coupling circuits, however, and two control signals are applied to this winding in phase opposition with respect to each other. Consequently, the two control signals effectively cancel each other, in the input circuit of the detector 21, with the result that no more than a negligible output signal is developed at the output terminal 27 of the detector. In fact, unless the phase relationship between the two applied signals is substantially displaced from the desired 180° phase differential, or one of these control signals is very much larger than the other, no appreciable output signal is developed at the output terminal of the detector. It is thus seen that the effective operating condition for the detector 21, with both of the switches 33 and 35 in their "X" positions, is substantially the same as when both switches are in their "O" positions. This operating condition for the logical device 10 is illustrated by the last line of the truth table, FIG. 2.

From the foregoing description, it is seen that the logical device 10 comprises an effective and dependable A.C.-actuated logical circuit of the "Exclusive-Or" kind. The control signals for the logical device are derived from a conventional A.C. power supply, and there is no need to utilize a D.C. signal source or a pulse-type signal source. The logical circuit is extremely simple in construction, and utilizes a single electronic control device, the transistor 22 of the detector circuit 21. Although the illustrated embodiment of the invention, in FIG. 1, utilizes the two switches 33 and 35 as the principal control element, either one or both of these switches can be replaced, in an essentially similar circuit, by virtually any kind of variable impedance, with substantially similar results, as explained in greater detail hereinafter. The logical circuit 10 is suitable for use in machine tool control systems, in other industrial control systems, and in other applications requiring rugged and substantially trouble-free performance with a minimum of maintenance. Normal fluctuations in the signal source 15, which may be caused by switching of external circuits, do not materially affect the operation of the logical device 10.

FIG. 3 illustrates a logical device 40 which, although different in construction from the circuit 10 of FIG. 1, is based upon the same principles and operates in essentially the same manner as the logical device 10. The input circuit to the logical device 40 comprises an A.C. power supply 41, which may be a conventional sixty-cycle A.C. source, or any other suitable source of alternating current. The logical device 40 further includes a variable reactor or transformer 42 of the movable-armature type. The reactor 42 comprises a U-shaped core 43 having a primary winding 44 on one leg of the core and a secondary winding 45 on the other leg of the core. The reactor 42 further includes a movable armature or core member 46 which is displaceable between an initial or "O" position, shown in solid lines, and a second or "X" position, indicated by the dash outline 46A. The primary winding 44 of the reactor 42 is connected across the power supply 41.

A simple detector circuit 51 is incorporated in the logical device 40, the detector comprising a transistor 52 having a base electrode 53, an emitter electrode 54, and a collector electrode 55. The base electrode 53 is connected to one end of the secondary winding 45 on the variable reactor 42. The emitter electode 54 is grounded, whereas the collector electrode is connected to a suitable biasing source E— by a load circuit which includes, in series, the operating coil 56 of a control relay 57. The control relay 57 may be provided with any number of operating contacts; only one pair of contacts 58 are shown in FIG. 3.

The remaining terminal of the secondary winding 45 of the reactor 42 is connected to a switch 59. The switch 59 is a single-pole double-throw device, having an "O" terminal which is grounded and an "X" terminal which is connected back to the power supply 41. The coupling circuit from the switch 59 to the power supply 41 comprises a resistor 61 which is connected across the power supply and a variable tap 62 for the resistor which is returned to the "X" terminal of the switch 59. Preferably, a capacitor 63 is connected in parallel with one section of the tapped resistor 61.

In considering the operation of the logical device 40 of FIG. 3, it may first be assumed that the armature 46 of the variable reactor 42 is in its "O" position, and that the switch 59 is also in its "O" position. Under these circumstances, the effective impedance of the reactor 42 is quite high. Consequently, although a relatively high-amplitude signal may be applied to the primary winding 44 of the reactor, only a relatively low-amplitude signal is induced in the secondary winding 45. The construction of the circuit is preferably such that, under these circumstances, the signal applied to the input electrode 53 of the transistor 52 is not sufficient to render the transistor conductive. Accordingly, the operating coil 56 of the relay 57 is not energized and contacts 58 remain in their normal position. This operating condition, with the relay 57 not energized, may be considered to represent the "O" operating condition for the logical control device 40.

If the magnetic core or armature 46 is moved to its alternate or "X" position 46A, the mutual coupling between the windings 44 and 45 increases to a substantial extent. Stated differently, the effective impedance of the variable reactance 42 decreases substantially. Consequently, a control signal of substantial amplitude is applied to the input electrode 53 of the detector circuit 51. As a consequence, the transistor 52 is rendered conductive, energizing the control relay 57 to establish what may be referred to as the "X" operating condition for the logical control device.

If the armature 46 is left in its "O" position and the switch 59 is closed to its "X" condition, the logical control device 40 is also actuated to its "X" operating condition. Thus, closing of the switch 59 to its "X" condition is effective to apply a control signal of substantial amplitude to the secondary winding 45 of the reactor 42 and hence to the input electrode 53 of the detector circuit 51. Accordingly, an output signal of substantial amplitude is developed at the output terminal 65 of the detector, energizing the relay 57 and thus duplicating the operating effect of moving the armature 46 to its alternate or "X" position.

On the other hand, if the armature 46 is moved to its alternate or "X" position 46A, and the switch 59 is also closed to its "X" position, two control signals are applied to the input circuit of the detector circuit 51, comprising the secondary winding 45 on the core 43 of the variable reactance 42. The circuit is constructed to apply these two signals to the winding 45 in substantially opposing phase, with the result that the two signals tend to cancel each other and no more than a relatively low-amplitude signal is effectively applied to the base electrode 53 of the detector transistor 52. Accordingly, the output signal appearing at the output terminal 65 of the detector circuit is essentially negligible for this operating condition, the relay 57 is not actuated, and the logical control device 40 remains in its initial or "O" operating condition. Accordingly, it is seen that the truth table of FIG. 2 is equally applicable to the embodiment of FIG. 3, despite the changes in the actual circuit as compared with the embodiment of FIG. 1.

The circuit illustrated in FIG. 3 also includes a second detector circuit 66 which is essentially similar to the detector 51 and which is incorporated in a logical device 67 which may be essentially similar to the driving circuit for the detector 51. Furthermore, and also as indicated in FIG. 3, additional logical control circuits may also be connected to the relay 57. A construction of the kind illustrated in FIG. 3, with a single control device such as the relay 57 controlled from a series of individual logical elements, such as the circuits 40 and 67, is highly advantageous in some applications, particularly those in which it is desirable to control a single operation in accordance with a plurality of different control criteria. Thus, this particular circuit is used advantageously in a tool selection system described in detail in the co-pending application of Myron L. Anthony, Serial No. 23,046 filed April 18, 1960.

FIG. 4 illustrates another embodiment of the invention, comprising a logical device 70, which is different in construction from the previously described embodiments yet which operates in accordance with the same basic principles to produce the same results. The logical circuit 70 comprises a power supply 71 which, as before, may be a conventional sixty-cycle power source. The power supply 71 is coupled to an input transformer 72, the primary winding 73 of the transformer being directly connected across the power supply. The input transformer 72 is provided with a center-tapped secondary comprising two sections 74 and 75. The logical device 70 further includes a detector circuit 76 which comprises a diode 77. The cathode of the diode 77 comprises the output electrode of the detector, and is connected to a conventional output circuit including a resistor 78 connected in parallel with a capacitor 79 between the cathode of the diode 77 and ground.

As in each of the previously described embodiments, the control signal source comprising the input transformer 72 is connected to the detector 76 by means of two individual coupling circuits. In this instance, the two circuits are essentially similar to each other. The first coupling circuit comprises a control switch 81 which is connected in series with a resistor 82 between the section 74 of the input transformer secondary and the anode or input electrode of the diode 77. The second coupling circuit comprises a similar control switch 83 connected in series with a resistor 84 between the secondary section 75 of the input transformer and the anode or input electrode of the detector diode. Each of the two switches 81 and 83 is a single-pole double-throw device having one terminal, designated as the "X" terminal, connected to the input transformer 72, and further having a second or "O" terminal. In the circuit of FIG. 4, the two "O" terminals of the control switches 81 and 83 are grounded, but the two switch terminals may also be left open-circuited if desired.

In considering the operation of the logical device 70, it may first be assumed that the switches 81 and 83 are each in their open or "O" position. This being the case, no input signal is applied to the detector 76 from the input transformer 72 and, of course, no output signal is developed at the output terminal 85 of the detector circuit. This operating condition, with no appreciable output signal developed by the detector circuit, may be considered to represent the "O" operating condition of the detector and is represented by the first line of the truth table of FIG. 2, the switches 81 and 83 being substituted for the switches 33 and 35 respectively.

If the switch 81 is actuated to its closed or "X" operating condition, and the switch 83 remains unchanged, a control signal of substantial amplitude is applied to the detector circuit 76, producing an output signal at the terminal 85. Similarly, if the switch 83 is closed to its "X" condition and the switch 81 remains in its "O" position, an appreciable output signal is developed at the terminal 85. Insofar as the detector 76 is concerned, it makes no substantial difference as to which of the two switches 81 and 83 is closed; the detector conducts on alternate half cycles of the applied A.C. signal, and the resulting output signals are essentially the same.

A fourth operating condition is, of course, possible in the logical device 70, this four condition being effected by closing both of the switches 81 and 83 to their "X" terminals. When this is done, a control signal is applied to the detector 76 through the first coupling circuit comprising the section 74 of the secondary winding of the input transformer 72, the switch 81, and the coupling resistor 82. At the same time, a control signal of substantial amplitude is applied to the detector through the second coupling circuit comprising the transformer winding section 75, the switch 83, and the coupling resistor 84. The two A.C. control signals, however, are approximately equal in amplitude and approximately 180° displaced in phase with respect to each other, with the result that the net effective signal applied to the detector is essentially negligible. Consequently, with both of the switches 81 and 83 actuated to their "X" positions, the signal output from the detector 76 is negligible and the logical device 70 therefore exhibits an "O" output essentially indistinguishable from the initial operating condition in which both switches 81 and 83 are open. The only noticeable variation introduced into operation of the circuit by grounding of the "O" terminals of the switches 81 and 83 is to reduce the amplitude of the output signal from the detector 76 to one-half the value which would be realized if these terminals were left open-circuited.

The logical devices 10, 40 and 70 of FIGS. 1, 3 and 4 each utilize one or more switches to control operation of the logical device. These control switches, such as the switches 33 and 35 in FIG. 1, may be considered simply as a species of variable resistance or variable reactance, however, since they may comprise virtually any device actuatable from a low-impedance condition to a high-impedance condition. The analogy to a more conventional variable reactance is clearly illustrated by the circuit of FIG. 3, in which the variable inductance 42 performs substantially the same effective operation as the switch 33 of FIG. 1. Furthermore, it should be understood that it is not necessary to use a moving-armature variable reactance; a conventional saturable reactor controlled by energization of a saturating winding, instead of by physical movement of a portion of the core, may be employed instead of the device 42 of FIG. 3 without substantial change in operation of the circuit.

FIG. 5 illustrates yet another embodiment of the invention in which variable capacitors are utilized as the principal control elements for the logical device 90 illustrated therein. In most respects, the device 90 of FIG. 5 is essentially similar to the circuit 70 of FIG. 4 and, accordingly, similar reference numerals are applied to the corresponding parts of the two circuits. Thus, the coincidence circuit 90 of FIG. 5 comprises an A.C. power source 71 connected to an input transformer 72 having a primary winding 73 and a split secondary 74, 75, the center tap of the secondary winding being grounded. The detector circuit 76 is the same as in FIG. 4 and comprises the diode 77 and an output circuit including the resistor 78 and the capacitor 79. The output terminal of the detector is again indicated by the reference numeral 85.

The first coupling circuit from the input transformer 72 to the detector 76, in the logical device 90 of FIG. 5, comprises a variable capacitor including a pair of stationary plates 92 and 93 and a movable plate 94 which is disposed in overlapping relation to the two stationary plates. The movable capacitor plate 94 can be adjusted from an initial or "O" position, in which it is spaced from the plates 92 and 93 by a substantial distance, and a coupling or "X" position indicated by the dash line 94A, in which the plate 94 is disposed in relatively close proximity to the plates 92 and 93. One stationary plate 92 of the capacitor 91 is connected to the secondary winding section 74 of the input transformer, whereas the other stationary plate 93 of the capacitor is connected through the coupling resistor 82 to the diode 77 of the detector circuit 76.

The second coupling circuit for the logical device 90 is essentially similar to the first, and comprises an adjustable capacitor 95 connected in series with the coupling resistor 84 between the secondary section 75 of the input transformer and the diode 77 of the detector circuit. The variable capacitor 95 includes a pair of stationary plates 96 and 97 and a coupling plate 98 which is movable between the "O" position shown in solid lines and an alternate or "X" position, in close proximity to the fixed plates 96 and 97, indicated by the dash line 98A.

In considering the operation of the logical device 90, it may be first assumed that the two movable capacitor plates 94 and 98 are disposed in the "O" positions illustrated in FIG. 5 in solid lines. Under these conditions, the capacitive coupling afforded by each of the two capacitors 91 and 95 is relatively poor, with the result that only relatively weak signals are applied to the detector 76, and no appreciable output signal appears at the output terminal 85 of the detector. By moving the capacitor plate 94 to its "X" position 94A, however, the capacitive coupling in the first control or coupling circuit is substantially increased, with the result that a control signal of substantial amplitude is applied to the detector circuit, thereby developing a substantial ouput signal at the output terminal 85. Similarly, the coupling plate 98 of the capacitor 95 may be moved to the alternate position 98A, this being the "X" position for this variable capacitor, to apply a second control signal to the detector 76 and develop an appreciable output signal at the terminal 85. If both of the variable capacitors 91 and 95 are adjusted to their "X" positions, however, control signals of substantially equal amplitude are applied to the detector circuit 76 in phase opposition with respect to each other. Consequently, no appreciable output signal is developed by the detector circuit 76 when both of the coupling capacitors 91 and 95 are adjusted to their "X" operating condition. Accordingly, it is seen that the truth table of FIG. 2 is directly applicable to the circuit of FIG. 5.

FIG. 6 illustrates a logical device 170 which is essentially similar to the logical circuit 70 described hereinabove in connection with FIG. 4 but which is provided with a relatively simple additional circuit to afford a "carry" signal output under certain operating conditions. Thus, the logical element 170 includes a power supply 171 connected to the primary 173 of a transformer 172, the secondary winding 175 of the transformer having a grounded center tap. The detector circuit 176 for the logical circuit 170 is similar to that of FIG. 4, and comprises a diode 177 connected to a conventional output circuit comprising a resistor 178 and a capacitor 179. The output terminal of the detector 176 is indicated by the reference number 185. As before, two individual coupling circuits are utilized to connect the two sides of the transformer secondary 175 to the input terminal of the detector 176. Thus, the first of these two coupling circuits comprises the switch 181, whereas the second comprises a switch 183. The input terminal to the detector 176 is identified by the reference numeral 184.

In the circuit of FIG. 6, a resistor 187 is inserted in series with the second coupling circuit comprising the switch 183. There is no corresponding resistor in the first coupling circuit comprising the switch 81. This is not to imply that there can be no impedance in the first coupling circuit; however, the resistor 187 represents an incremental impedance in the second coupling circuit over and above that of the first circuit. The resistor 187, however, is made relatively small as compared with the effective impedance of the detector circuit 176. Since the detector impedance, represented primarily by the impedance of the diode 177, is usually very large, the resistor 187 can be substantial in size and this relationship may still be maintained.

The primary 191 of the coupling transformer 192 is connected across the resistor 187. The secondary winding 193 of the coupling transformer comprises the input circuit to a second detector circuit 196 comprises a diode 197, a resistor 198, and a capacitor 199. The output terminal 201 of the detector 196 is shown connected to the control winding 202 of a a saturable reactor 203, the main winding of the saturable reactor being indicated by reference numeral 204. The saturable reactor 203 may comprise one of the control elements in a logical circuit of the kind with which the present invention is concerned, as described hereinafter.

In considering the operation of the logical device 170, it may first be assumed that the two switches 181 and 183 are each in their open or "O" position. Under these conditions, no substantial input signal is applied to either of the two detectors 176 and 196; consequently, no significant output signal is developed at the output terminal 185 of the first detector or at the output terminal 201 of the second detector. This operating condition may be defined as the "O" operating condition of each of the two detector circuits. Thus, the initial operating condition for the circuit of FIG. 6, as described hereinabove, is that represented by the first line of the truth table of FIG. 7.

When the switch 181 is actuated to its closed or "X" operating condition, as indicated by the second line of the truth table, with the switch 183 remaining in its "O" position, a control signal of substantial amplitude is applied to the detector circuit 176. Accordingly, an output signal is developed at the output terminal 185 of this circuit. However, since the switch 183 remains open, no substantial operating potential is developed across the resistor 187. Accordingly, no significant input signal is applied to the second detector circuit 196, to the coupling transformer 192, with the result that the output signal at the terminal 201 remains essentially as before. Accordingly, this second operating condition is that illustrated by the second line of the truth table of FIG. 7.

The switch 183 may also be closed to its "X" position with the switch 181 remaining in its open or "O" position. When this is done, a control signal of substantial amplitude is applied to the detector circuit 176, producing an output signal of substantial amplitude at the output terminal 185 of the detector. Because the impedance of the resistor 187 is made very low as compared with the impedance of the detector circuit, only a small fractional portion of the signal voltage appears across the resistor 187. Although this signal is applied to the detector circuit 196, through the coupling transformer 192, it is a relatively simple matter to construct the detector circuit so that no significant output signal appears at the terminal 201. Consequently, the third operating condition for the circuit 170, with the switch 183 closed and the switch 181 open, provides the operating characteristic indicated by the third line of the truth table of FIG. 7.

The fourth and final operating condition for the logical element 170 is effected by closing both of the switches 181 and 183, this being the condition set forth in the fourth and final line of the truth table of FIG. 7. Under these conditions, a control signal is applied to the detector 176 through the first coupling circuit comprising the switch 181. A control signal of substantial amplitude is also applied to the detector 176 through the second coupling circuit comprising the switch 183. The two A.C. control signals, however, are in substantial phase opposition relative to each other and are approximately equal in amplitude. Accordingly, the net effective signal applied to the input terminal 184 of the detector 176 is of negligible amplitude, with the result that no significant output signal is developed at the output terminal 185. Thus, insofar as the output terminal 185 is concerned, the logical circuit 170 affords an "O" output not essentially different from that afforded under the initial operating condition with both switches 181 and 183 open.

The situation is substantially changed, with both of the switches 181 and 183 closed, however, insofar as the second or "carry" detector circuit 196 is concerned. Thus, with both of these switches in the "X" position, the entire signal voltage induced in the secondary winding 175 of the input transformer appears across the resistor 187. This being the case, a relatively large input signal is applied, through the coupling transformer 192, to the detector circuit 196, resulting in the development of a substantial output signal at the output terminal 201 of the detector. This operating condition may be defined as the "X" operating condition for the detector 196. Thus, the complete operating condition for the circuit 170, with both of the switches 181 and 183 closed, is that set forth in the fourth and final line of the truth table of FIG. 7.

Of course, it is not essential to use a coupling transformer, such as the transformer 192, in the circuit of FIG. 6. Instead, any other suitable coupling circuit may be employed, as, for example, a conventional capacitive coupling circuit connected to a load resistor in the input to the detector diode 197. As noted hereinabove, the saturable reactor 203 may comprise one of the control devices or control elements in a logical circuit of the kind to which the present invention is directed. Thus, the device 203 could be utilized in any of the circuits of FIGS. 1–5 instead of the switches or other variable impedance devices shown therein as the control elements for the logical circuits. In some applications, this arrangement, using a saturable reactor, may be highly desirable because it permits the use of A.C. actuation signals in each of the logical elements, yet provides for convenient control of those A.C. signals in response to the D.C. output signals from the individual logical circuits. Of course, it will also be understood that the use of a particular detector circuit in connection with any of the logical elements described hereinabove is not critical. For example, the diode detector circuits of FIGS. 4–6 can be utilized instead of the transistor detectors shown in FIGS. 1 and 3, and vice versa. Of course, it is almost always desirable to make the detector circuit as simple as possible to keep the cost of the logical circuit down. Moreover, the use of the saturable reactor 203 of FIG. 6 is not limited to circuit provided with a "carry" detector; the same arrangement may be employed, if desired, to couple the main output of any of the logical circuits to another similar logic element or to other operating circuits as desired.

Hence, while I have illustrated and described the preferred embodiments of my invention, it is to be understood that this is capable of variation and modification, and I therefore do not wish to be limited to the precise details set forth, but desire to avail myself of such changes and alterations as fall within the purview of the following claim.

I claim:

An A.C.-actuated coincidence device comprising: control signal means for developing first and second A.C. control signals having the same frequency; an amplitude detector having an input circuit and an output circuit; first and second coupling circuits, each coupling said control signal means to said detector input circuit, for individually applying said first and second control signals, respectively, to said detector, said coupling circuits each including an independent means for varying the effective impedance of the circuit between a low-impedance condition and a high-impedance condition; and means intercoupling said first and second coupling circuits in parallel relation with each other to combine said first and second control signals in substantially opposed phase and equal amplitude, relative to each other, in said detector input circuit, said intercoupling means comprising a coupling transformer coupled in series in said first coupling circuit and having a secondary winding coupled in series with said second coupling circuit.

References Cited by the Examiner

UNITED STATES PATENTS

| | | | |
|---|---|---|---|
| 2,204,578 | 6/40 | Davis | 330—145 |
| 2,668,910 | 2/54 | Starr | 328—101 |
| 2,785,305 | 3/57 | Crooks et al. | 328—93 |
| 2,808,474 | 10/57 | Maynard et al. | 330—145 |
| 2,879,411 | 3/59 | Faulkner | 307—88.5 |
| 2,934,706 | 4/60 | Johnson et al. | 328—92 |
| 3,023,378 | 2/62 | Fuller | 330—145 |

OTHER REFERENCES

Russell: IBM Technical Disclosure Bulletin, vol. 2, No. I, June 1959, page 31.

JOHN W. HUCKERT, *Primary Examiner.*

GEORGE N. WESTBY, HERMAN KARL SAALBACH, ARTHUR GAUSS, *Examiners.*